Jan. 16, 1962 G. F. BAEZ Re. 25,116

ROTARY PUMPS AND THE LIKE

Original Filed Jan. 19, 1955 2 Sheets-Sheet 1

INVENTOR.
Guillermo Federico Baez
BY Charles Fleischer
ATTY

ROTARY PUMPS AND THE LIKE
Original Filed Jan. 19. 1955 2 Sheets-Sheet 2
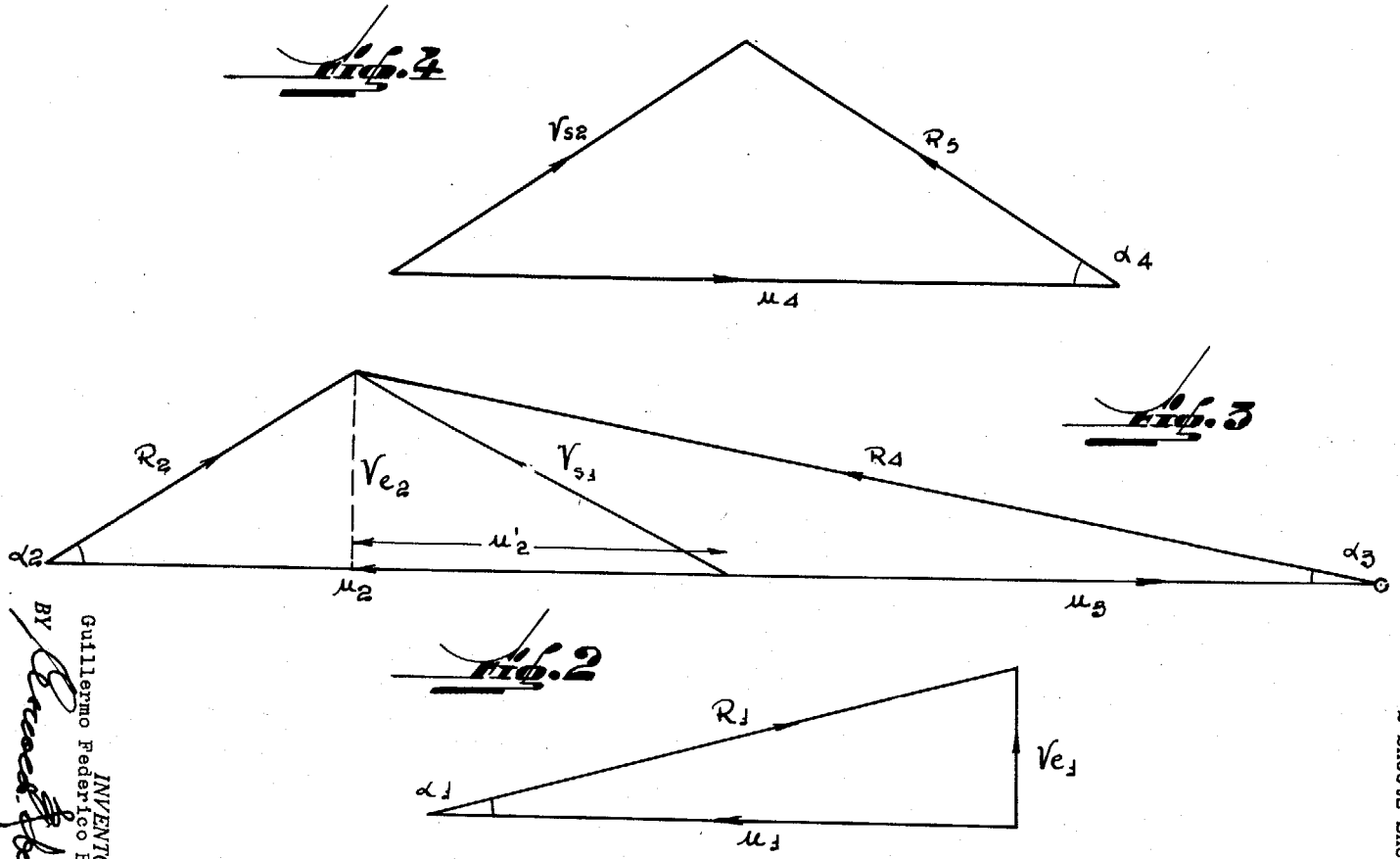
INVENTOR.
Guillermo Federico Baez
BY
ATTY.

United States Patent Office

Re. 25,116
Reissued Jan. 16, 1962

25,116

ROTARY PUMPS AND THE LIKE

Guillermo Federico Baez, Hotel Seville, New York, N.Y.

Original No. 2,771,036, dated Nov. 20, 1956, Ser. No. 482,815, Jan. 19, 1955. Application for reissue Sept. 17, 1959, Ser. No. 840,785.
4 Claims. (Cl. 103—94)

Matter enclosed in heavy brackets [ ] appears in the original patent but forms no part of this reissue specification; matter printed in italics indicates the additions made by reissue.

The present invention refers to improvements in pumps, compressors and the like. More particularly it refers to improvements in the rotary pumps described and claimed in my U.S. Patent No. 2,620,735 of December 9, 1952.

The cited patent discloses a rotary pump which as an essential feature includes two rotors rotating in opposite directions. When the blades of the first rotor deliver the fluid to the blades of the second rotor a specific effect of impact is obtained which results in an increase of the lifting power as compared with conventional centrifugal or turbine pumps.

The present invention is based on the discovery that in order to obtain optimum results the blades of one rotor must have a given slope or pitch with regard to that of the blades of the other rotor. However, the improvement of the present invention is applicable not only in connection with the pump described in the cited patent, but also in connection with other similar structures wherein two or more rotors rotating in opposite directions are employed.

One of the main objects of the present invention is therefore to provide a rotary pump including two or more rotors rotating in opposite directions having their blades inclined or pitched in such a way that an optimum lifting effect is obtained.

Another object of the invention is to simplify the structure shown in my United States Patent No. 2,620,735 in order to obtain the same or better yields.

Another object of the invention is to render unnecessary in the cited structure the use of certain parts, since these may be disposed of when the blades are given such inclination or pitch which according to the present invention allows optimum results to be obtained.

Figure 4:
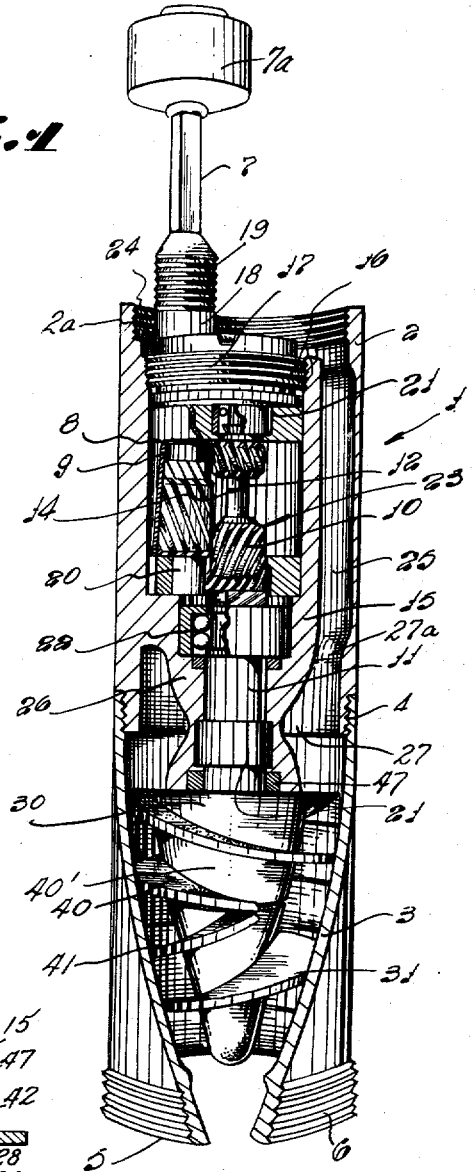
Figure 5:
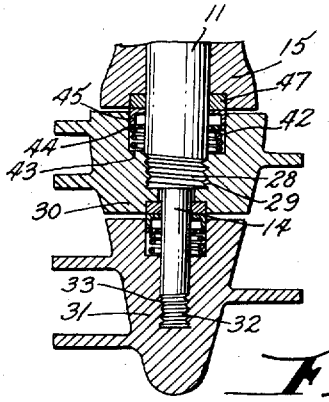

These and other objects of the invention will be evident from the following more detailed description of one embodiment of the invention which has been illustrated in the accompanying drawings wherein FIGURE 1 is an elevation, with parts broken away, partially in cross-section, of a rotary pump according to the present invention;

FIGURES 2, 3 and 4 are graphical representations showing the relative inclination or pitch of the rotor blades; and FIGURE 5 is an enlarged sectional view showing the seals between relatively moving parts of the rotor.

Throughout the figures the same reference numerals and characters have been employed in order to designate the same or corresponding parts.

Referring to FIGURE 1, it will be seen that the rotary pump, according to the embodiment of the invention illustrated therein, comprises a cylindrical housing 1, consisting of an upper portion 2 and a lower portion 3, screwed or otherwise hermetically joined together at 4. Inside, the two portions form a single chamber. The lower portion 3 has a lower open end 5, which is preferably provided with a screw thread 6, or other means which allow such end to be attached to pipes, hoses or the like, which lead to the supply or source of liquid to be lifted.

The upper portion 2 of the housing 1 is designed to contain [mainly] *mainly* the power transmitting mechanism for driving the rotors housed in the lower portion 3.

Such transmission is contained within an inner housing 15 provided at its upper end with an inner thread 16 into which the cap 17 is screwed. Cap 17 is provided with an upper extension 18 having an external thread 19 from which the driving shaft 7 projects. The driving shaft 7 is adapted to be rotated by any source of power represented diagrammatically at 7a, such as for example, an electric motor or a combustion engine.

The upper end of portion 2 of the housing 1, is also provided with internal threads 2a in order to permit a cover (not shown) to be fixed to the assembly. Such cover would have a central opening through which extension 18 projects to the exterior. A hose or similar cover for the shaft 7 may be fixed to the external threads 19 on the extension 18.

The shaft 7 mounted in suitable bearings 8 and 20 carries within the upper portion or body 2, a pinion 9 which meshes with pinion 10 secured to driven shaft 11 which is mounted in suitable bearings 21 and 22. The upper portion of pinion 9 meshes with a pinion 12 mounted on a satellite shaft 23, while pinion 12 meshes with another pinion 13 secured to driven shaft 14 which extends within the hollow shaft 11 already mentioned. It will be understood that shaft 11 and 14 will rotate in opposite directions. The relations between the sizes of the several pinions are such that the two driven shafts rotate at the same speed which may be equal to that of driving shaft 7 or greater or smaller than the latter. The ratios will be selected in accordance with the work for which the pump is destined and according to the speed of shaft 7 which again depends on the motor employed and on the presence or absence of speed reducers inserted between the motor and shaft 7.

As can be seen from the drawings, the inner housing 15 is arranged eccentrically so that at one lateral side thereof there is a vertical passage 25 which serves as an outlet for the liquid or fluid lifted or compressed. The lower end of inner casing 15 is tapered so as to form a lower extension 26 which occupies the center of the lower portion 2 of the casing 1 and the widened end portion of which projects into the upper central part of the lower body 3 to serve as a housing for the bearing 21 already mentioned and also to enclose the lower end of hollow shaft 11. The lower extension 26 is surrounded by an annular chamber 27 which receives the liquid or fluid discharged by the rotors and which through a helical passage 27a is in free communication with passage 25.

The lower end of hollow shaft 11 is provided with external threads 28, whereto the upper rotor 30[,] is screwed by means of its corresponding internal thread 29 (FIG. 5). The pitch of the threads extends in such direction that, when the transmission already described causes the shaft 11 to rotate, said shaft tends to be screwed onto the rotor 30. In a similar way, the lower rotor 31 is joined to the inner shaft 14 by means of threads 32 and 33 the pitch of which extends in an opposite direction as compared with threads 28, 29. Therefore, when shaft 7 rotates, the rotor 30 will rotate in an opposite direction and rotor 31 in the same direction as shaft 7, and both rotors will rotate at the same speed.

Each of the rotors 30, 31 has two helical blades 40 and 41, respectively, the pitch of the respective blades being in opposite directions so that the four blades, when the rotors 30, 31 rotate in opposite directions, will lift the liquid or fluid towards the annular receiving chamber 27.

In order to achieve a seal between the rotary parts of the device and the inner casing 15, conventional stuffing boxes may be employed, or preferably use may be made of the system illustrated in FIG. 5, which includes a spring 42 mounted on an annular seat 43 on the rotor 30. The opposite end of spring 42 urges a rubber washer or the like 44 against the casing 45 which has the form of an inverted cup and which is fixed to shaft 11. The entire assembly rotates with the shaft, and the pressure of the spring on the washer 44 provides a very efficient seal; the sealing effect is increased during rotation, due to the action of threads 28, 29.

The upper face of the cup 45 bears against a ring-like structure 47 secured to the inner casing structure 15.

A similar arrangement is employed in connection with the inner shaft 14 and its rotor 31, to provide a seal for the inner casing 15. The individual parts of such arrangement can be easily ascertained from the drawings and are therefore not described in detail.

It will be seen that each rotor 30, 31 carries two helical blades 40 and 41, respectively. It will be evident that any desired number of blades may be mounted on each rotor.

It will also be evident that whilst a pump for liquids has been illustrated and described, a similar arrangement may be employed for fluids and also for compressing gases. More particularly, it is within the purposes of the invention to employ the general principle described in the construction of turbine compressors such as for instance compressors for jet engines. In this connection it will be clear that the system of the present invention greatly increases the output as compared with conventional systems inasmuch as the conventional stator blades are replaced by rotary blades moving in an opposite direction relative to the rotor blades.

Returning now to the pairs of blades 40 and 41, it will be seen that each of the blades 40 of rotor 30 is developed as a helix, so that between the two blades 40 a divergent path 40' for the fluid is formed. I have found that, in order that the transformation of energy in path or channel 40' between the blades 40 be effected in the best possible manner, the blades must have a given inclination or pitch with respect to the rotor shaft, whereby optimum results are obtained. The basic principle has been illustrated in the vectorial graphs of FIGURES 2 to 4. In these representations it has been assumed that the fluid passing through the rotor is ideal, that is, that it flows without any dynamic losses due to friction, whirls, etc., and without losses in volume (i.e., a continuous, not intermittent, flow is assumed). In the same way, it has been supposed that the blades are infinitely thin so that they do not interfere with the flow of the fluid. In order to obtain the values to be employed in practice it is therefore necessary to modify those hereinafter set forth, as will be obvious to those familiar with the art.

Furthermore, the drawings have been made on the basis of the values corresponding to average speeds, that is, the speeds occurring at the [centre] *center* of each blade.

Referring now to FIGURE 2, it will be seen that the same [illustrates the order of movement corresponding to rotor 31, and relates to the admission of the fluid as follows:] *is a vectorial representation of the movement of the fluid at the entry or inlet end of the lower or first rotor 31, and that, in such vectorial representation*:

[$n_1$] $u_1$=mean tangential velocity at the entry of rotor 31;
$Ve_1$=velocity of the admission of fluid to rotor 31;
$R_1$=relative velocity between the fluid and the rotor 31 (which determines the inclination or pitch of the [admission blade 41'] *blade 41 at its admission or entry end*, or in other words, the angle $\alpha_1$ at the admission end of blade [41'] *41*).

From the foregoing it will be evident that the angle $\alpha_1$, may be selected according to the amount of the flow of fluid desired. The angle or pitch of blade 41 at the outlet end of rotor 31 will determine, on the other hand, the impetus which the fluid is given by the rotor 31.

This can be seen from FIGURE 3 wherein:

[$n_2$] $u_2$=tangential mean velocity at the outlet end of rotor 31;
$R_2$=relative velocity of the fluid at the outlet end of rotor 31 (which determines the angle $\alpha_2$ and the inclination or pitch at the outlet of rotor 31, and the impulse or impetus given to the fluid depends on this angle);
[$V_{51}$] $V_{s_1}$=velocity of the fluid at the outlet of rotor 31.

The angle or pitch $\alpha_3$ of the blade 40 of *upper or second* rotor 30 must be related, according to the present invention, to the angle [$\alpha_3$] $\alpha_2$ in order to obtain maximum results by taking up the impulse in the rotor 30 which rotates in an opposite direction. This relation is also illustrated in FIGURE 3 wherein:

[$n_3$] $u_3$=mean tangential velocity of the counter-rotation at the inlet end of rotor 30.

The ratio [$V_{51}$ and $n_3$ determine] *of $V_{s_1}$ to $u_3$ determines* the relative velocity $R_4$ and therefore the inclination or pitch which in view of the rotation in [an] *the* opposite direction must be given to the blade [40'] *40* at the inlet end of rotor 30 (and which is the angle $\alpha_3$).

From the foregoing it may be deduced that the outlet velocity [$V_{51}$] $V_{s_1}$ of the rotor 31 can be [decomposed into] *considered the vectorial sum of* two factors, to wit $Ve_2$=axial velocity at the outlet end; *and*
[$n'_2=\sqrt{V_{51}^2-Ve_2^2}$] $u'_2=\sqrt{V_{s_1}^2-Ve_2^2}$ Consequently, $$\left[\mathrm{tg}\alpha 3=\frac{Ve_2}{n'_2+n_3}\right] \tan\ \alpha_3=\frac{Ve_2}{u'_2+u_3}$$

in which equation [$n_3$] $u_3$ is the tangential counter-rotation velocity.

FIGURE 4 illustrates the inclination or pitch of blade 40 at the outlet end of rotor 30 as angle $\alpha_4$ which preferably is selected to be equal to the angle $\alpha_2$.

In FIGURE 4

[$n_4$] $u_4$=mean tangential velocity at the outlet end of rotor 30;
$R_5$=relative velocity of the fluid at the outlet of rotor 30, which determines the angle $\alpha_4$ (=pitch of blade 40 at the outlet end);
[$V^5_2$] $V_{s_2}$=velocity of the fluid at the outlet of rotor [2] *30*.

It will be seen that the known values permit the optimum value of the pitch of blade 40 at the inlet end of rotor 30 to be determined.

I claim:

1. A device for lifting or compressing fluids, which comprises a casing having an inlet opening and an outlet opening; a first rotor mounted within said casing and provided with a plurality of blades adapted to move the fluid from said inlet opening towards said outlet opening; a second rotor mounted within said casing between said first rotor and said outlet opening, and provided with a plurality of blades extending in a direction opposite to that of the blades of the first rotor; a motor; and a mechanism for transmitting motion from said motor to said rotors in order to drive said first rotor in such a direction that the fluid is moved from said inlet towards said outlet and to drive said second rotor at the same speed as said first rotor but in an opposite direction, the pitch of the blades of said second rotor at the end adjacent the first rotor corresponding to the equation $$\left[\alpha 3=\frac{Ve_2}{n'_2+n'_3}\right] \tan\ \alpha_3=\frac{Ve_2}{\alpha u'_2+u_3}$$

wherein $\alpha_3$ is the pitch of said blades *of the second rotor at the end adjacent the first rotor*;
$Ve_2$ is the axial velocity at the outlet end of said [second] *first* rotor;
[$n_3$] $u_3$ is the tangential velocity of the counter-rotation *of said second rotor*; and
[$n'_2$ is $\sqrt{Ve_1^2-Ve_2^2}$] $u'_2$ *is* $\sqrt{V_{s_1}^2-Ve_2^2}$ wherein

[$Ve_1$] $V_{s_1}$ is the velocity of the [admission of] fluid at the [inlet] *outlet* end of the first rotor [;] . [and $Ve_2$ is the velocity of the fluid at the discharge end of said first rotor.]

2. A device for lifting or compressing fluids according to claim 1, wherein each rotor is provided with a shaft, the shaft of one of said rotors being hollow and the shaft of the other rotor extending within said hollow shaft.

3. A device for lifting or compressing fluids according to claim 1, wherein said second rotor is provided with a hollow shaft and said first rotor is provided with a shaft extending within said hollow shaft, said mechanism comprising a first pinion mounted on a shaft driven from said motor and meshing with a second pinion secured to said hollow shaft and with a third pinion mounted on a satellite shaft, said third pinion meshing with a fourth pinion secured to the shaft of the first rotor.

4. A device for lifting or compressing fluids according to claim 1, wherein said mechanism is also housed within said casing.

References Cited in the file of this patent or the original patent

UNITED STATES PATENTS

| | | |
|---|---|---|
| 190,038 | Hough | Apr. 24, 1877 |
| 2,620,735 | Baez | Dec. 9, 1952 |